J. GOOD.
FUEL SUPPLY MEANS FOR COMBUSTION ENGINES.
APPLICATION FILED FEB. 3, 1915.

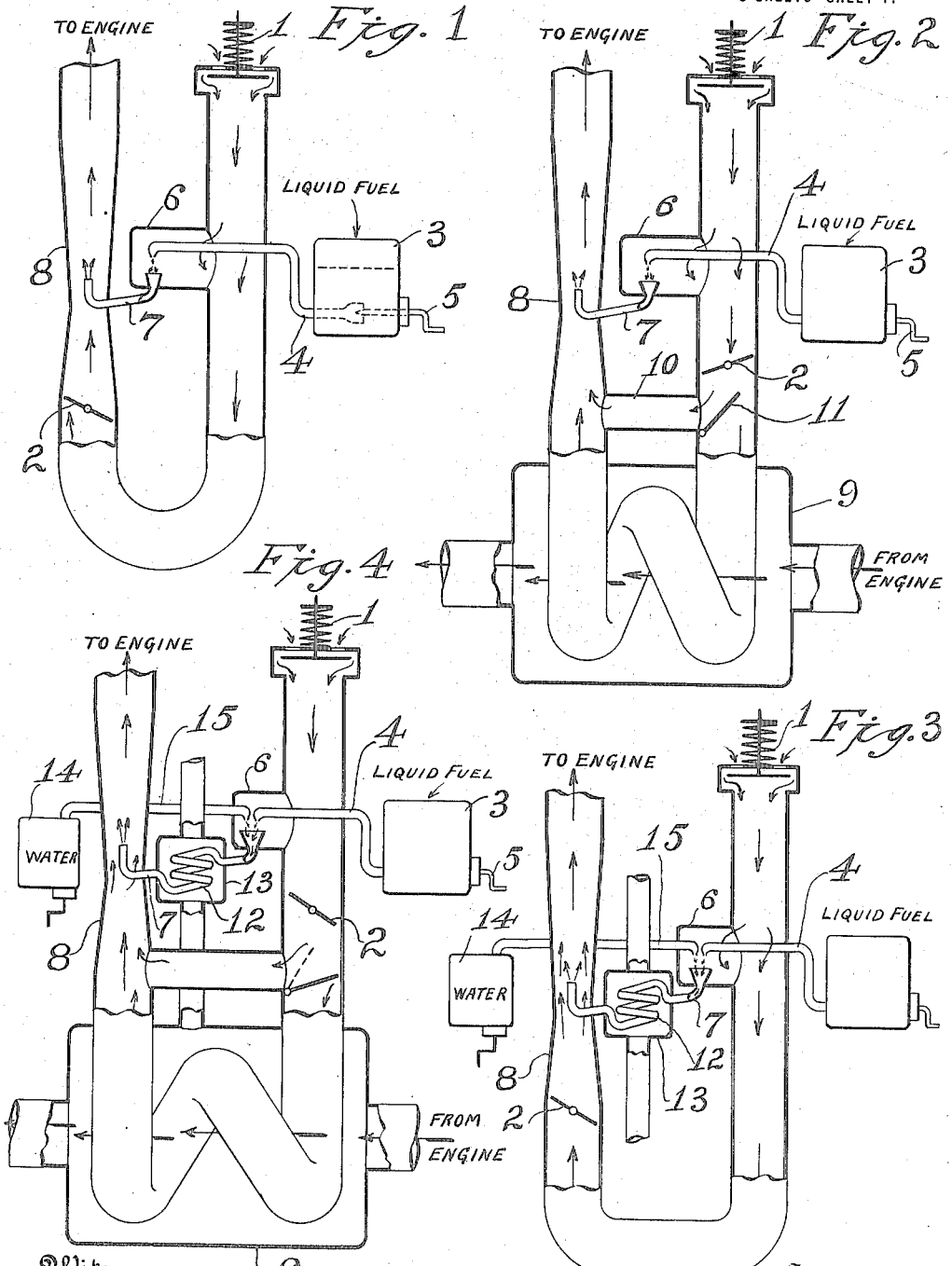

1,273,356.

Patented July 23, 1918.
3 SHEETS—SHEET 2.

Witnesses:
Wm H Hawkins
K. L. Grant

Inventor
John Good
By Attorney

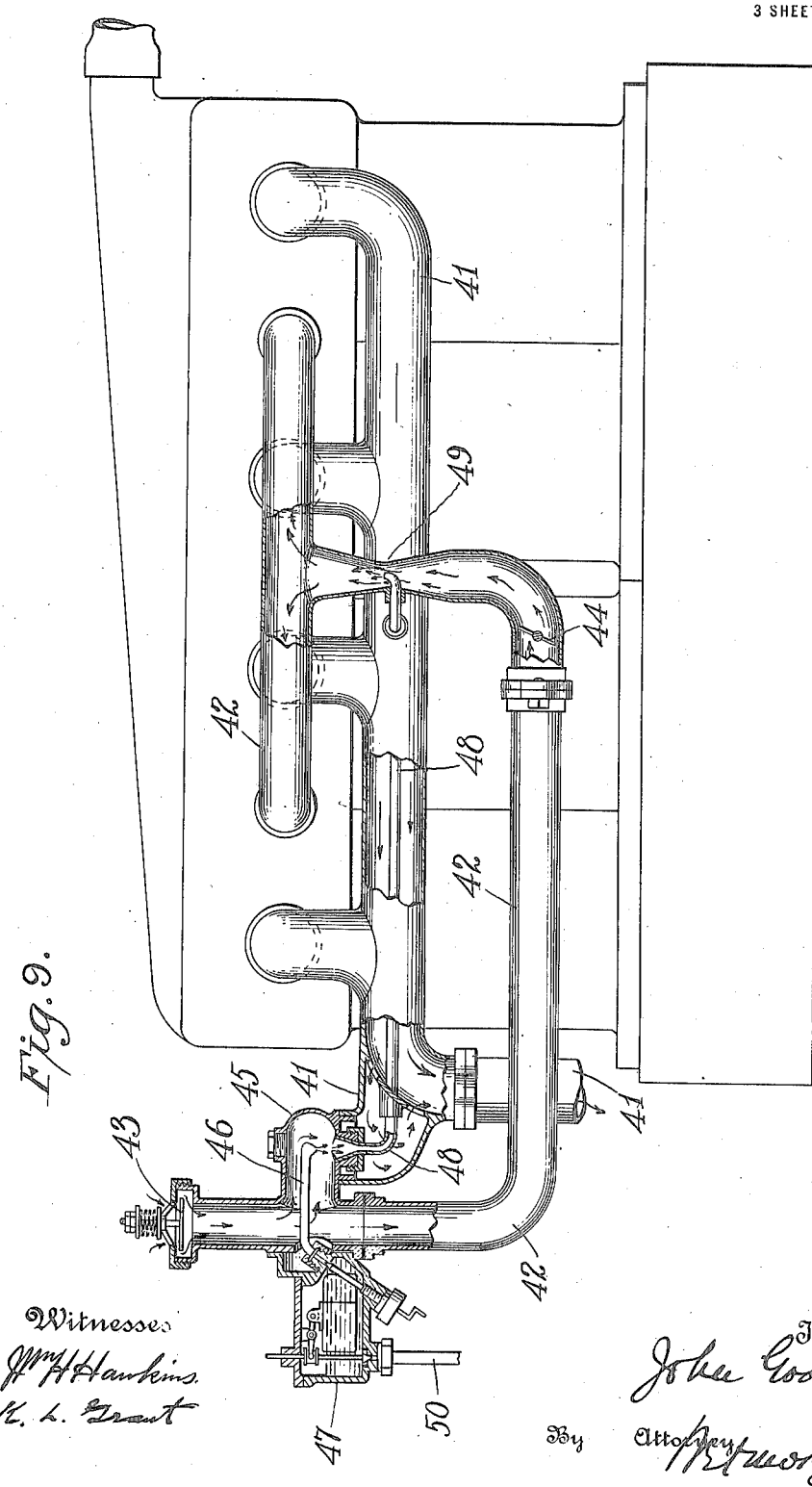

UNITED STATES PATENT OFFICE.

JOHN GOOD, OF BROOKLYN, NEW YORK, ASSIGNOR TO GOOD INVENTIONS CO., OF BROOKLYN, NEW YORK, A CORPORATION OF NEW YORK.

FUEL-SUPPLY MEANS FOR COMBUSTION-ENGINES.

1,273,356.                    Specification of Letters Patent.     Patented July 23, 1918.

Application filed February 3, 1915. Serial No. 5,850.

*To all whom it may concern:*

Be it known that I, JOHN GOOD, a citizen of the United States, residing in Brooklyn, county of Kings, and State of New York, have invented the following described Improvements in Fuel-Supply Means for Combustion-Engines.

The invention provides a simple and effective means for producing combustible mixtures of air and liquid fuel, particularly the heavy non-volatile fuels, for use in that class of combustion engines which receive their fuel charge by the suction effect of their piston members. The invention consists in the means hereinafter more fully set forth, whereby a charge of liquid fuel is automatically measured in accordance with the requirements of the engine, free from disturbance by local temperature conditions and without immediate mixture with the air with which it is to be consumed, and whereby such measured charge may be separately conducted to the place of mixture with said air, thereby permitting the application of heat to one or both of the components of the resulting mixture independently of each other and before their union, and also affording numerous additional advantages respecting the operation and control of the engine, as will hereinafter be made apparent to those skilled in this art.

In the drawings, Figures 1, 2, 3, 4, 5 and 6, are diagrams representing different embodiments or forms of the principle of this invention.

Figure 5:
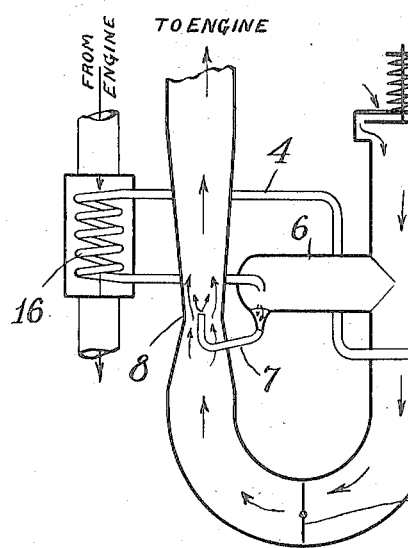

Fig. 9 a side elevation of an ordinary multi-cylinder engine with parts broken out and showing one mode of applying the invention thereto.

Referring first to Fig. 1, the spring controlled check valve marked 1, at the entrance to the intake passage, may be understood to represent the ordinary air check used in gasolene engines and to have any desired characteristic of action, and the opposite end of such passage is to be understood as connected to the engine through the engine inlet valve in the usual or any desired manner, whereby the air for combustion is drawn through the valve and passage and a relative vacuum or depression is produced therein as determined by the characteristic of the force which tends to close the check-valve. Such vacuum effect in the present case may be assumed to be produced by the engine piston or pistons and is utilized, as in the ordinary engine, as the means of measuring and moving the fuel and air to their place of combustion. Within the said passage, the vacuum effect, considered in terms of pressure, is represented by a higher pressure adjacent the entrance or check valve 1, and a lower pressure adjacent the engine, the difference being due to the resistance the passage offers to the flow of the gaseous medium through it, or to the inertia of the medium, or to such special obstruction or resistance therein as may be represented by a throttle valve indicated at 2. When such throttle is present, the pressure difference is subject to variation, according to the adjustment of the throttle and the actual value of the difference is dependent upon the combined factors of throttle adjustment and engine speed, since a higher speed creates a higher velocity of flow through the passage. The higher pressure therein, existing at the check valve end of the intake passage, may serve in this engine, as in others, as the determining factor in the measurement of the fuel component of the combustible charge, the fuel being moved from its source of supply by the difference between such pressure and the still higher pressure at its said source, which may be atmosphere. In the diagram, the fuel supply is represented by a chamber or receptacle 3, and the fuel therefrom passes through a pipe 4, having a discharge nozzle located in the high pressure region in the intake passage. The liquid level in the receptacle 3 is maintained constant and slightly below the orifice of the discharge nozzle, so that flow of fuel through the pipe will take place substantially in proportion to the difference of the pressure existing at its opposite ends, such arrangement being similar in principle to the float-controlled fuel supply in many gasolene carbureters now in operation, but other means for furnishing fuel according to the conditions obtaining in the entrance region of the intake passage, are also suitable for the purpose of this invention as will presently appear. The rate of such flow through the fuel pipe is determined by means of a small valve, or needle valve, having an adjusting handle marked 5 in the diagram.

The discharge nozzle of the fuel pipe 4, is disposed preferably in a pocket 6 formed in the wall of the intake passage, between the check valve and throttle, where it will be mainly out of the path of the air current through the intake but subject, nevertheless, to the pressure or vacuum conditions obtaining therein. This location of the measuring nozzle, out of the path of the current, eliminates disturbance of the flow of fuel such as might occur if the nozzle were swept by the current.

The liquid discharged by the fuel pipe 4 is caught in the receiving end of a transfer pipe 7, to be transferred thereby separately from the main body of air, to the point where it is mixed with the air with which it is to burn. In the diagrammatic illustration the transfer pipe is represented as a short piece of tubing leading from the pocket 6 to the region of lower pressure on the opposite side of the throttle, being understood to be appropriately sealed to the walls it intersects. Movement of liquid through this pipe results from the difference of the pressures obtaining at its opposite ends assisted by gravity, as indicated in the diagram, and inasmuch as the said pipe is open to the air in the higher pressure region of the passage, some of that air may also accompany the liquid. The amount of air so taken may be relatively small as compared to the larger current that passes the open throttle and the diameter of the small transfer passage is desirably proportioned, in its relation to the engine, so that under the condition of minimum fuel supply and closed throttle, the said small amount will be sufficient of itself to satisfy the combustion of such minimum fuel. In such case, the throttle 2 being closed tight, all the fuel and air taken by the engine passes to it through the transfer pipe 7, and will be sufficient to keep it running while idling. The vacuum on the engine side of the throttle will then be at a maximum, and on the check valve side at a minimum. The corresponding high difference of pressure, imparts a vigorous motion to the fuel through the pipe, and a correspondingly rapid and also homogeneous dissemination of it throughout the vaporizing or combustion space, a condition particularly desirable for low loads. However it is not essential to this invention that the proportion of the fuel pipe be designed to produce the effect just stated, nor that any definite amount of air be transferred with the measured fuel.

Some air is desirable, in any event, since its presence in the transfer pipe serves to break up and divide the liquid into small portions which more readily scatter as spray when emerging into the mixing space adjacent or in the engine cylinder, thus facilitating vaporization and the formation of homogeneous mixture of the fuel and the air. The delivery nozzle of the transfer pipe, also, may be designed to scatter or spray the fuel. As a means of permanently preserving the pressure difference between the opposite ends of the transfer pipe even when the throttle is wide open, the said delivery nozzle is disposed within a Venturi contraction 8, in the intake, which may have any suitable proportions.

The local depression of pressure produced at the throat of the Venturi tube 8 gives a strong flow movement of the liquid fuel through the transfer pipe 7 and a vigorous spray form of discharge from its nozzle, causing a prompt and thorough mixture of the liquid with the main body of air under all conditions of throttle adjustment from wide open to idling. The Venturi tube constitutes the mixing chamber of the apparatus of this invention, the interior of the recovery or divergent portion of said tube being the place where the air and liquid first become intimately commingled for all conditions of operation.

Briefly referring to the operation of the diagram of Fig. 1, it will be observed that the vacuum obtaining at any given moment between the air check 1 and the throttle 2, determines the amount of liquid fuel drawn from the nozzle of fuel pipe 4, which fuel with some air thence passes through an independent and separate passage, to a point nearer its place of ultimate combustion, at which point it is distributed in the air and vaporized under the reduced pressure there existing, while the air, on leaving the point of fuel measurement passes through the larger passage, past the throttle, and rejoins the fuel at the delivery end of the transfer pipe. The adjustment of the throttle thus not only controls the flow of air but also the supply of fuel, since it controls the pressure in the pocket 6, and the relative amounts of fuel and air are thus automatically maintained in definite proportion to the vacuum as determined by the check valve for all throttle positions. As before stated, the characteristic of the check valve action may be as desired, but it is preferably designed so as to control the vacuum in such manner that the proportion of fuel and air shall be substantially constant for all conditions of operation. This involves an arrangement of parts to give a compensation for the known variation of the rate of flow of liquid fuel into the suction manifolds of combustion engines. While such compensation is desirable, for obvious reasons, it is not of consequence to the general principle of fuel transfer, herein described, whether such compensation is applied to the air supply or to the fuel supply, or to both, and various other supplementary features can be applied to use with the said principle. The separate transfer of the measured quantities of fuel and air, to their place of union, particularly lends itself to the efficient utilization for motive purposes of heavy fuel oils such as kerosene, solar oil, etc., since the heat necessary to vaporize such heavy oil can be applied to it after measurement, and without any attendant disturbance of proportion or otherwise, or any complication of structure, and also without danger of producing any condition likely to foul the engine or any of the parts.

The diagram of Fig. 2 illustrates the form of the invention when the heat is applied to the fuel by heating only the air with which it is to burn. For this purpose a portion or coil of the intake passage is inclosed in a box or stove 9, traversed by the hot exhaust gases of the engine itself, so that the air after passing the point of measurement will thereby become heated to the desired extent and prior to its union with the fuel. For the purpose of regulating the temperature of the air so that it may be no higher than just sufficient to effect complete and rapid vaporization, an air by-pass 10 is provided around the heater, controlled by a gate 11. Such gate may be assumed to indicate any means of heat control. The throttle 2 is placed at any point in the intake between the point of fuel measurement and the engine, where it will control the engine in the manner already indicated. Of course, instead of exhaust gas any other source of heat or any other mode of heating the air may be used, and it may be noted that variation of operation of the heater has no effect upon the proportions of the fuel and air, since the amounts of each are determined at a point in advance of it.

The Fig. 3 diagram shows the application of heat directly to the fuel while in transit and after measurement. In this diagram the transfer pipe 7, is provided with a coil 12 contained in a stove 13, where it is subjected to a current of hot exhaust gas from the engine, or other source of heat, and the fuel therein being heated accordingly. The throttle and other parts in this diagram are the same as in Fig. 1 and the operation is the same. The diagram also indicates, however, that water may be admixed with the measured fuel charge if desired, being measured therewith according to the same principle, that is to say, the water is taken from a receptacle 14 by a nozzled pipe 15 terminating in the pocket 6 alongside of the nozzle of the fuel pipe 4, and so as to discharge like the fuel into the funnel mouth of the transfer pipe and to be moved through the same with the fuel. The control of the water supply can also be accomplished by a needle valve as indicated.

It will now be obvious that both the air and the fuel may be separately heated after measurement of their relative proportions and the diagram of Fig. 4 illustrates the suitable arrangement of the parts for this purpose which will be recognized by the reference characters applied to them without further description.

The developed form of the invention appearing in the Fig. 5 diagram, shows an arrangement for heating the fuel while passing through the fuel pipe 4 and prior to its measurement and delivery to the transfer pipe 7. In this form the fuel pipe 4 is led to a coil 16, outside of the intake where it is subjected to the heat of the exhaust gases, from which coil it is led to the pocket 6, where it delivers the fuel thus heated into the transfer pipe 7, as in the preceding cases. In this form, as in the others, the location of the needle valve, or more particularly its valve seat, is at a point either removed from, or not subjected to, the temperature of the heat applying means, or of the particular medium heated thereby. The said valve seat is desirably disposed in the path of the incoming air, as shown in this figure and is thus kept at the temperature of such air which is substantially constant under ordinary conditions. The supply of fuel through the valve opening is thus also in constant relation to the forces which move it, since its condition of viscosity remains unchanged. The throttle and other parts in this figure are the same and have the same functions as in the preceding figures and it will be understood, of course, that the fuel heated prior to measurement, can be further heated if desired and that the air can also be heated in this form, as in the cases already described.

Figure 6:
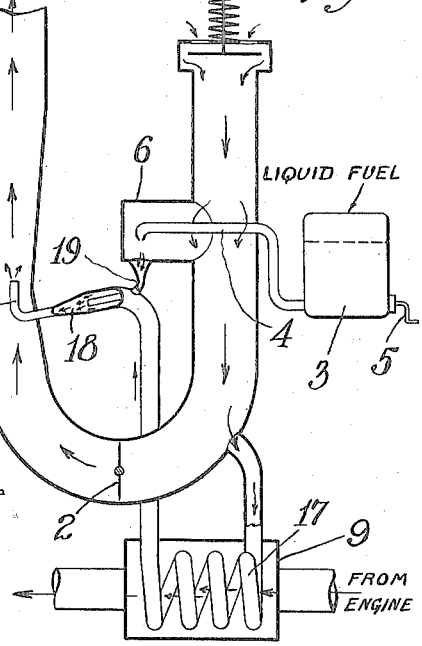

In Fig. 6, the fuel measured from the pipe 4 is heated by admixture with heated air while in transit through the transfer pipe or passage. Thus some of the air, after passing the point of fuel measurement, is diverted through a heated by-pass coil 17, from whence it is led to a chamber 18, forming part of the transfer passage. The measured fuel moves into this chamber through the receiving pipe section 19, together with some air taken from the pocket 6, and leaves the same through the continuing pipe section 20, by which it is delivered or discharged in the lower pressure region.

Figure 7:
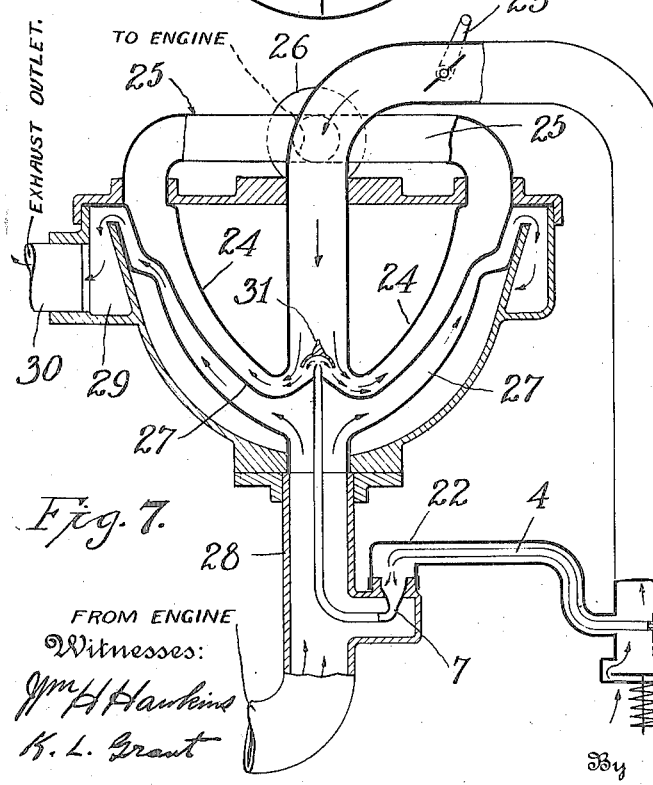
Fig. 7 shows the combination of such principle with a special form of vaporizing apparatus.

Referring now to Fig. 7, the flow of liquid fuel from the supply chamber 3, is controlled by the needle valve 5 seated within the intake passage 21, for the purpose above explained, and flows thence through the fuel pipe 4, inside a pocket extension 22 of the said intake and where it delivers fuel in accordance with the pressure condition obtaining at that region of the intake. Air enters the intake through the spring check 1 in amount determined by the throttle 23, and passes thence to the lower central point of an annular shallow vaporizing chamber 24, from which it passes through out-take pipes 25 to the intake valve of the engine designated by the circle 26. The vaporizing chamber 24, is formed by two bowl-shaped walls in spaced, nested relation to each other, the outer wall being in similarly nested relation to a third outer wall whereby an outer annular chamber 27 is formed around the other to be traversed by exhaust gases entering the same from the pipe 28 and leaving from the annular chamber 29 and off-take 30. The vaporizing chamber 24 is thereby sub- The vaporizing chamber 24 is thereby subjected to such degree of heat as conditions may require. The measured fuel discharged from the fuel pipe 4 is caught by the receiving end of the transfer pipe 7, and together with a small amount of air from the pocket 22 is moved upwardly and discharged against a distributer plate 31, which scatters it uniformly upon the walls of the shallow chamber. The movement or transfer of the fuel results in this case also from the difference in pressures existing at the receiving and delivery ends of the said pipe 7. The fuel discharged on the walls of the vaporizing chamber is distributed in a more or less uniform film condition thereon, while the air from the intake 21 scours over it in the form of a shallow high velocity air current and in a manner which has heretofore been found to be highly efficacious in converting heavy liquid fuels into vaporous condition with the least application of heat. The principle of the action of vaporizing apparatus of this class is fully described in application Serial No. 830,705, filed April 9th, 1914. This method of vaporization of heavy liquid fuel, as shown by Fig. 7 represents a means of applying heat for vaporizing purposes under the present invention, after the measured fuel has been mixed with the air with which it is to burn, or while it is being mixed, and further illustrates the use of the lower pressure existing in a mixing chamber subjected to externally applied heat to facilitate vaporization.

Figure 8:
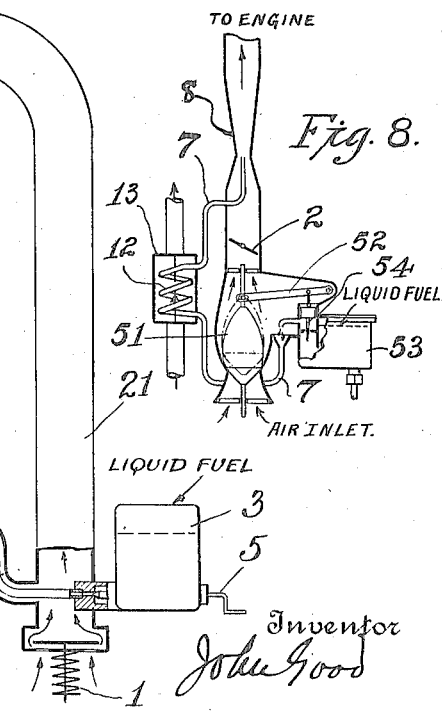
Fig. 8 is a further modification.

In the diagram of Fig. 8, the flow of air entering the intake raises the valve or body 51 more or less, as indicated by the dotted lines, and thereby, through the lever 52, varies the position of a small tapered pin 54 in the restricted outlet from the liquid chamber 53, thus permitting a larger or smaller quantity of liquid to be delivered into the receiving end of the transfer pipe 7, and according to the volume of air passing the said body. The transfer pipe is heated in a stove 13 and delivers its heated liquid, beyond the throttle 2, in the throat of the venturi 8, where it is vaporized and mixed with the air as in preceding cases. In this case, the position of the body 51 determines the measurement of the fuel delivered and may be independent of the vacuum condition obtaining in the entrance end of the intake. The vacuum therein may be constant for all constant speeds and loads on the engine. The small pin 54 connected to the lever may also be tapered in such way as to insure constant proportions of fuel and air for all throttle adjustments, as will be understood without further explanation.

It is not attempted in these drawings to illustrate the structural features whereby the several elements above described, and represented by the diagrams of Figs. 1 to 7, may be incorporated in engine apparatus, inasmuch as various forms of embodiment may obviously employ the principle of the invention now fully explained.

Fig. 9, however, represents a preferred application of the fuel heated type of my invention, as shown in Fig. 3 but without the use of water. In this figure 41 represents the exhaust pipe of the multi-cylinder engine, shown in outline, and 42 its intake manifold, to which air has entrance through a check valve 43 opening against the tension of a spring, or rather a series of graded springs, conforming to conventional practice. The design of this check valve and its spring-loading or closing means, can be as preferred by the maker, and should so far as possible, provide a vacuum condition in the intake which will vary harmoniously with the fuel supply, under all conditions of speed so as to preserve constant fuel and air proportions.

The throttle 44 in the said intake pipe corresponds to the usual throttle in such pipes, or to the throttle 2 in the diagram figures already described, and like such throttle, serves in conjunction with other factors to establish a region of relatively low pressure on the engine side and a region of relatively high pressure on the check valve side, both less than atmosphere. The throttle may completely close the passage. The higher pressure present in the pocket extension 45 located near the check valve determines the amount of fuel that flows through the fuel pipe 46 from a constant level fuel chamber 47, precisely in the manner already described in connection with Fig. 3. Such measured fuel enters the transfer pipe 48 and is moved therethrough by the difference of pressure, to a point of delivery at the waist of a Venturi contraction 49 in the engine side of the intake, the venturi 49 being the same venturi as shown at 8 in the diagram for the purpose already explained, of insuring rapid movement of the fuel through the pipe. The transfer pipe 48 lies within the exhaust pipe 41 and is therefore highly heated and highly heats its contents while in transit to their point of delivery in the venturi. In the type of engine shown, the measuring nozzle is conveniently located at about the level of the cylinder heads and so that an extension of the exhaust pipe 41 can be arranged to surround the transfer pipe up to its receiving end, such extension being in communication with the exhaust pipe by means of the openings indicated, affording circulation of exhaust within it. Practically the full length of the transfer pipe 48 is thus subjected to the temperature of the exhaust at its hottest point, and on reaching the air at the venturi, the fuel is ready for instantaneous vaporization. It will be noted that the introduction of the fuel at the point indicated, close to the inlet valves, is efficacious in producing uniform charges to each cylinder.

As in one of the forms already described, the needle valve of this form finds its seat within or close to the current of incoming air in the intake, being thereby adequately isolated from the temperature of the exhaust and thus maintained at substantially constant temperature and at a constant density. Fuel is supplied to the float chamber 47 through a fuel pipe 50 under the control of a float-controlled valve of the usual kind, the liquid in the chamber being understood to be open to atmospheric pressure, also as usual. For starting such engine when using heavy fuel, the section of the exhaust pipe containing the transfer-pipe may be preliminarily heated, or a more volatile fuel can be used until the exhaust pipe reaches the requisite temperature.

When the throttle is fully closed, the air accompanying the fuel through the transfer-pipe is sufficient to keep the required idling at its lowest speed.

In each of the several forms herein described the measurement of the liquid by, or in the required proportion to, the air, takes place without extensive contact or mixture therewith and the air carries no fuel with it past the throttle; that is to say, all of the fuel, under all positions of the throttle, passes through the transfer pipe 7, a condition which is rendered possible by the local pressure depression in the Venturi mixing chamber 8, and which is promoted by the isolation of the entrance end of the transfer pipe in a dead space (6) where it is out of the air flow. The separation of the main body of air and liquid at the time of their measurement and their separate conduction to the mixing chamber, is a condition that is present during the normal running of the engine and not during idling only and thereby constitutes one of the characteristic distinctions of this invention over the prior art wherein it is common to provide an idling tube from a source of fuel to some point in the intake on the engine side of the throttle. Such tubes which are well known, are for the purpose of keeping up a vigorous flow movement when only small quantities of air and fuel are needed to keep the engine turning over and they are only active when the throttle is closed or practically closed, the whole or most of the mixture being formed in advance of the throttle at all other times.

Claims.

1. Means for supplying combustible mixture to internal combustion engines, comprising a mixing chamber having an intake for pure air only, a constant level liquid fuel supply receptacle having a liquid discharge opening subject to the pressure of the air near the entrance to said intake and adapted to deliver the liquid in predetermined ratio to the air entering the intake, a liquid transfer pipe separate from said air intake for conducting all the liquid from said discharge opening to said mixing chamber, and means constantly preserving a pressure difference between the ends of said transfer pipe whereby the liquid fuel is discharged thereby into the mixing chamber under all conditions of engine adjustment.

2. Means for supplying combustible mixture to internal combustion engines, comprising a mixing chamber having an air intake pipe, a liquid fuel supply receptacle having a discharge opening subject to the pressure of the air at the entrance to said pipe and adapted to discharge the liquid in predetermined ratio to the air entering said pipe, a liquid transfer pipe for separately conducting the so-discharged liquid to the mixing chamber, means for permanently maintaining a relatively low pressure in the mixing chamber for discharging the liquid from said transfer pipe, and means for heating one of said pipes.

3. Combustible mixture-producing means for internal combustion engines, comprising a space in which the fuel is mixed with air, an air intake pipe leading to such space, an air inlet to said intake and an air throttle between said mixing space and inlet, in combination with a liquid fuel supply receptacle having a discharge opening subject to the air pressure in said inlet and adapted to deliver liquid in predetermined ratio to the air entering said inlet, a liquid transfer pipe conducting all the so-discharged liquid to the mixing space separate from said air pipe, and means independent of the throttle for permanently maintaining a pressure in the mixing space lower than the pressure at the liquid-receiving end of said transfer pipe, whereby the liquid component of the combustible mixture is transferred through said pipe throughout the full range of fuel charge variation.

4. Means for supplying fuel to internal combustion engines, comprising a space in which the fuel is mixed with air, an air intake leading to such space, an air inlet to said intake and an air throttle between said space and inlet, in combination with a liquid fuel supply receptacle having a discharge opening adapted to deliver liquid in a predetermined ratio to the air entering said inlet, a liquid transfer pipe conducting all the so-discharged liquid from a point in said intake to the said mixing space, means for heating said pipe, and means independent of the throttle for permanently maintaining a pressure-actuated liquid flow through said transfer pipe for all throttle adjustments.

5. Means for supplying combustible mixture to internal combustion engines, comprising a Venturi tube constituting a mixing chamber and connected with an intake pipe having an inlet for pure air, a liquid fuel supply receptacle having a discharge opening arranged to deliver liquid in definite ratio to the air entering said inlet and subjected to the pressure of the air at said inlet, and a liquid transfer pipe separate from the intake pipe, directly receiving the liquid from said discharge opening and conducting the same to the throat of said Venturi tube.

6. Means for supplying combustible mixture to internal combustion engines, comprising a Venturi tube constituting a mixing chamber and connected with an air intake pipe having an inlet for pure air and a throttle between the said tube and said inlet, a liquid receptacle having a discharge opening arranged to deliver liquid in a definite ratio to the air entering said inlet and subjected to the pressure of the said air, a liquid transfer pipe separate from the intake pipe, directly receiving the so-discharged liquid and conducting the same to the throat of said Venturi tube, whereby the liquid flow in said pipe is independent of the throttle adjustment, and means for heating said transfer pipe.

7. In fuel supply means for internal combustion engines, an air and fuel proportioning device comprising a valve-controlled air inlet and a liquid discharge nozzle subject to the pressure determined by said inlet, a mixing chamber, a pipe or passage conducting air only from said device to the chamber, a second pipe or passage conducting all the fuel from said device to the chamber, and means for permanently maintaining a lower pressure in the mixing chamber than at said proportioning device during the full range of engine operation.

8. Liquid fuel supply means for internal combustion engines, comprising in combination with the space in which the fuel is mixed with air, an intake pipe leading to such space, having an air inlet and a throttle between said inlet and space, a liquid discharge opening subject to the air pressure in said pipe between the throttle and the inlet and located out of the direct path of the air flow in said pipe, and a transfer pipe directly receiving the liquid from said opening and separately conducting the same to the mixing space.

9. Fuel supply means for internal combustion engines, comprising in combination with a fuel and air mixing space, an intake pipe leading thereto having an air inlet and a throttle between said inlet and the chamber, a liquid discharge opening subject to the air pressure in said pipe between the throttle and the inlet and located out of the air flow in said pipe, a transfer pipe directly receiving the liquid from said opening and separately conducting the same to said mixing chamber, and means for heating one of the said pipes.

10. Fuel supply means for internal combustion engines, comprising a Venturi tube constituting a mixing chamber, an intake pipe leading thereto having an air inlet valve and an air throttle between said valve and the chamber, a liquid discharge opening subject to the air pressure in said pipe between the throttle and the valve and located out of the air flow in said pipe, a transfer pipe directly receiving the liquid from said opening and separately conducting the same to said mixing chamber, and means for heating one of said pipes.

11. Means for supplying combustible mixture to internal combustion engines, comprising a Venturi tube constituting a mixing space and a passage leading air to said tube, a liquid fuel supply chamber having an outlet through which the liquid flows in predetermined ratio to the air flow through said air passage and a liquid pipe separate from said air passage and conducting all the liquid fuel to said Venturi tube.

12. Means for supplying combustible mixture of heavy fuel to internal combustion engines, comprising a throttle-controlled suction intake including a Venturi tube constituting a mixing space, a passage leading air only to said tube, a separate pipe leading all the liquid to said tube, means for supplying the heat to vaporize the liquid, and means at the entrance to said air passage for automatically maintaining a predetermined ratio of flow of liquid fuel and air to said Venturi tube.

13. Means for supplying combustible mixture to combustion apparatus comprising a mixing space for liquid fuel and air having an intake pipe for leading air thereto, a liquid fuel chamber having a normally open outlet subject to the pressure of the air in said intake pipe near the entrance thereto and located above the liquid level in said chamber and adapted to deliver liquid in a predetermined ratio to the air flow in said intake, a transfer pipe conducting all the liquid from said outlet to said mixing space, means for heating said pipe to heat the fuel in transit to the mixing space and means constantly preserving a pressure difference between the ends of said transfer pipe whereby the liquid fuel is discharged thereby into the mixing space.

14. Means for supplying combustible mixture to combustion apparatus comprising a space in which liquid fuel is mixed with air and having an air intake pipe leading thereto, a liquid fuel receptacle having a discharge opening subject to the pressure in said intake and located above the liquid level of said receptacle and adapted to discharge the liquid in a predetermined ratio to the air flow through said pipe, a liquid transfer pipe for separately conducting the so-discharged liquid to said mixing space, means for permanently maintaining a relatively low pressure in the mixing space for discharging the liquid from said transfer pipe, means for heating one of said pipes and means for varying the air flow to control the rate of mixture delivery.

In testimony whereof, I have signed this specification in the presence of two witnesses.

JOHN GOOD.

Witnesses:
　H. G. KIMBALL,
　G. A. TAYLOR.